US005081843A

United States Patent [19]

Ishibashi et al.

[11] Patent Number: 5,081,843

[45] Date of Patent: Jan. 21, 1992

[54] COMBUSTOR FOR A GAS TURBINE

[75] Inventors: Yoji Ishibashi; Takashi Ohmori, both of Hitachi; Fumio Kato, Ibaraki; Michio Kuroda; Nobuyuki Iizuka, both of Hitachi, all of Japan

[73] Assignee: Hitachi, Ltd., Tokyo, Japan

[21] Appl. No.: 423,749

[22] Filed: Oct. 19, 1989

Related U.S. Application Data

[63] Continuation of Ser. No. 177,429, Apr. 1, 1988, abandoned.

[30] Foreign Application Priority Data

Apr. 3, 1987 [JP] Japan ................................ 62-80959

[51] Int. Cl.[5] .......................... F02C 3/04; F23R 3/30; F23R 3/34

[52] U.S. Cl. ...................................... 60/733; 60/737; 60/748

[58] Field of Search ................ 60/732, 733, 737, 748, 60/39.29, 760

[56] References Cited

U.S. PATENT DOCUMENTS

| | | | |
|---|---|---|---|
| 3,859,787 | 1/1975 | Anderson et al. | 60/737 |
| 4,138,842 | 2/1979 | Zwick | 60/737 |
| 4,704,869 | 11/1987 | Iizuka et al. | 60/760 |

FOREIGN PATENT DOCUMENTS

| | | | |
|---|---|---|---|
| 894054 | 4/1962 | United Kingdom | 60/748 |
| 2146425 | 4/1985 | United Kingdom | 60/733 |

OTHER PUBLICATIONS

Japanese Patent Unexamined Publication No. 61-22127.
Japanese Patent Unexamined Publication No. 61-22106.
U.S. Patent No. 4,292,801.

*Primary Examiner*—Richard A. Bertsch
*Assistant Examiner*—Timothy S. Thorpe
*Attorney, Agent, or Firm*—Antonelli, Terry, Stout & Kraus

[57] ABSTRACT

A combustor for driving a gas turbine includes a first burning stage and a second burning stage. The combustor further comprises a primary combustion chamber in which air from the associated compressor and fuel are burnt, a pre-mixing chamber in which air from the associated compressor and fuel are pre-mixed, a main combustion chamber in which fuel/air mixture is burnt and forwarded to the gas turbine, an air passage provided in a wall of the main combustion chamber, through which air from the compressor flows to cool the wall thereof, and an intercommunicating air passage for intercommunicating the air passage to the pre-mixing chamber, whereby cooling air for the main combustion chamber wall is used to supplement the air in the pre-mixing chamber.

11 Claims, 5 Drawing Sheets

COMBUSTOR FOR A GAS TURBINE

This application is a continuation of application Ser. No. 177,429, filed Apr. 1, 1988, now abandoned.

FIELD OF THE INVENTION AND RELATED ART STATEMENT

The present invention relates to a combustor for a gas turbine and, more particularly to a combustor cooperating with a compressor in driving a gas turbine in which a temperature of an inlet gas from the combustor is relatively high.

In the prior art combustor, there are provided a first burning stage and a second burning stage, in both of which air from the associated compressor and fuel are burnt, and the burnt gas is supplied to the associated gas turbine to drive the same. In, for example, U.S. Pat. No. 4,292,801, JP-A-62-212106 A-62-22106 or JP-A-62-22127, air from the compressor is previously mixed or pre-mixed with fuel in a pre-mixing chamber to produce a pre-mixture and then the pre-mixture is supplied to the second burning stage. Accordingly, it can be possible to provide a uniform distribution of flame temperature in the burning stage and then to burn a poor mixture lean. Therefore, it becomes possible to reduce the amount of NOx in the burnt or combusted gas generated in the burning stages.

To the contrary, in recent years, it has been required to raise a temperature of the inlet gas of the gas turbine so as to obtain a high output. To this end, it has been proposed that a larger amount of fuel be supplied to the combustor. Accordingly, in order to maintain the amount of NOx at a low level, a larger amount of air must be supplied to the combustor. However, the amount of air to be supplied to the combustor is limited according to the capacity of the associated compressor. Namely, a part of air from the compressor is supplied to the combustor to cool a combustion chamber so as to prevent a metal wall of the combustion chamber from melting down, a part of air from the compressor is supplied to the pre-mixing chamber to produce a pre-mixture of air and fuel, an the rest of air is supplied to the combustor to be burnt or combusted with fuel in the first burning stage. Accordingly it becomes difficult to supply a larger amount of air to the combustor due to the limited amount of air. Therefore, when it is required that an inlet gas of a higher temperature must be supplied to the gas turbine, a rich mixture is burnt or combusted in the combustor, so that it becomes impossible to maintain the amount of NOx low level.

OBJECT AND SUMMARY OF THE .NVENTION

Therefore, it is an object of the present invention to provide a combustor which can provide a burnt gas of a higher temperature to a gas turbine as well as in which an amount of NOx generated in the burning stages is kept at a lower level.

To this end, according to the present invention, a part of air from the compressor is used not only to cool the combustion chamber wall but also to be air to be introduced into the pre-mixing chamber to produce a poor mixture.

Namely, according to the present invention, a combustion chamber of the combustor is provided in a wall means thereof with an air passage through which air from the compressor flows to cool the wall means of the combustor. Such cooling air is further introduced into the pre-mixing chamber through an air passage means for intercommunicating the air passage to the pre-mixing chamber.

In accordance with further features of the present invention, a movable ring is provided for varying an effective opening area of the air passage means according to a change of an effective opening area of an air passage through which air from the compressor flows into the pre-mixing chamber. Accordingly, in case of a low load or a partial load operation of the gas turbine, according to the reduction of the amount of fuel to be supplied to the combustor, the amount of air to be supplied to the pre-mixing chamber is reduced to keep the burning condition proper, namely not only the amount of air from the compressor to be supplied to the pre-mixing chamber but also the cooling air to be supplied to the pre-mixing chamber is reduced.

The above and other objects and features of the present invention will be apparent from the following description of the preferred embodiments described in connection with the accompanying drawings.

DETAILED DESCRIPTION OF PREFERRED EMBODIMENTS

Figure 1:
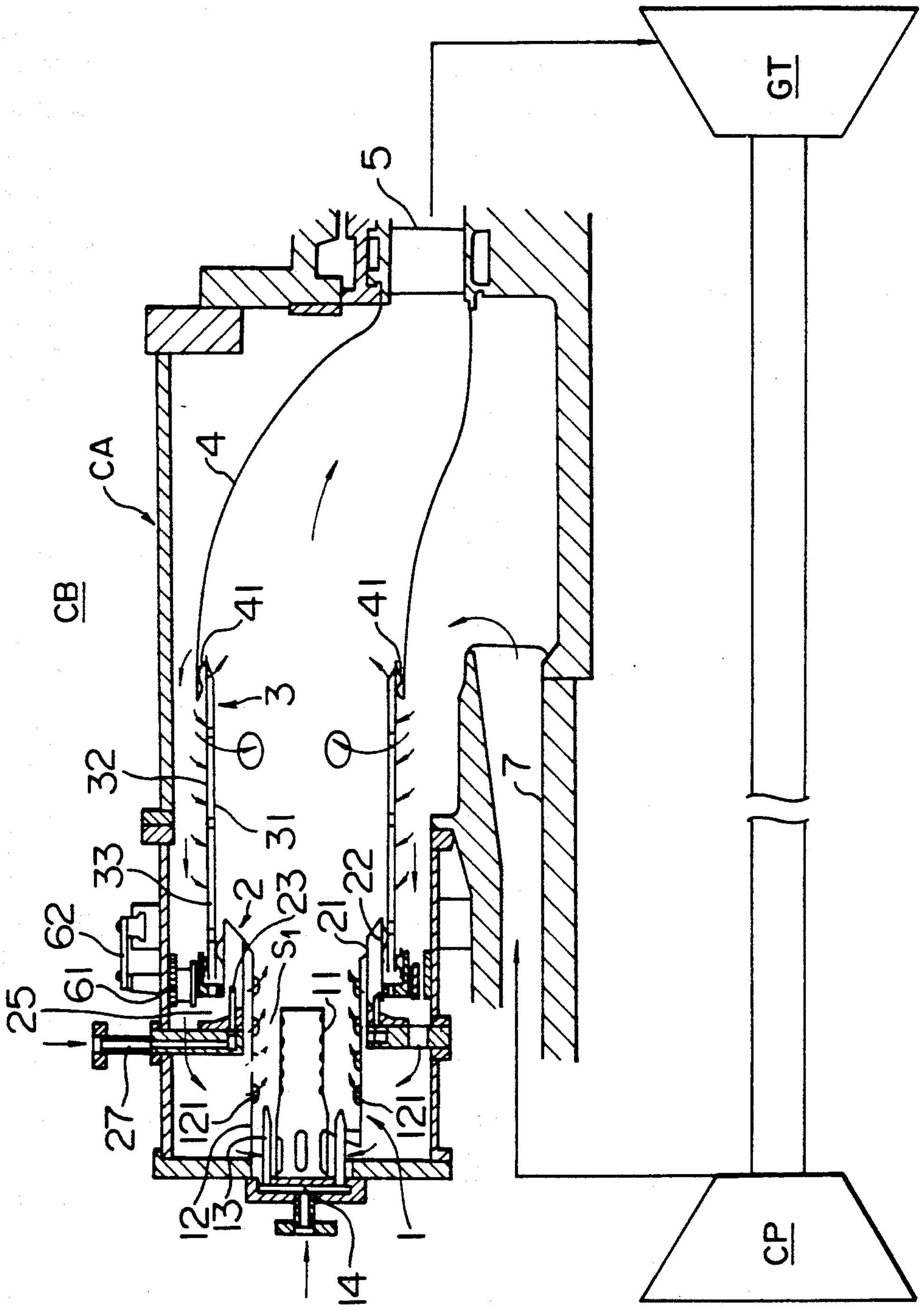
FIG. 1 is a sectional view showing a combustor according to one embodiment of the present invention.

Referring to FIG. 1, a combustor CB according to one embodiment of the present invention is disposed between a compressor CP and a gas turbine GT coaxial with the compressor CP in a gas turbine plant. Fuel is supplied to and burnt or combusted with air from the compressor CP in the combustor CB and then burnt gas or combusted is supplied to the gas turbine GT to drive the same. The combustor CB includes a casing CA in which disposed are a primary combustion chamber generally designated by the reference numeral 1, a pre-mixing chamber generally designated by the reference numeral 2, a main combustion chamber 3, a transition duct 4 and a tail chamber 5.

The primary combustion chamber 1 includes an inner tube 11 and an outer tube 12 surrounding the inner tube 11 to define therebetween an annular space S1. A plurality of fuel injection nozzles 13 are, disposed circumferentially spaced from each other, with each of the fuel injection nozzels 13 extended into the space S1.

The pre-mixing chamber 2 is of an annular shape, by an inner chamber wall 21 and an outer chamber wall 22 coaxially surrounding the inner chamber wall 21. A plurality of fuel injection nozzles 23 are disposed circumferentially spaced from each other, with each of the fuel injection nozzles 13 extending into the pre-mixing chamber 2.

The main combustion chamber 3 includes an inner cylindrical wall 31 and an outer cylindrical wall 32 cooperating with the inner cylindrical wall 31 to define therebetween an annular air passage 33. The main combustion chamber 3 is connected at one axial end portion thereof to the pre-mixing chamber 2.

The transition duct 4 is connected at one end portion thereof to the other axial end portion of the air combustion chamber 3 through spring seal members 41 and at the other end portion thereof to the tail chamber 5.

Figure 2:
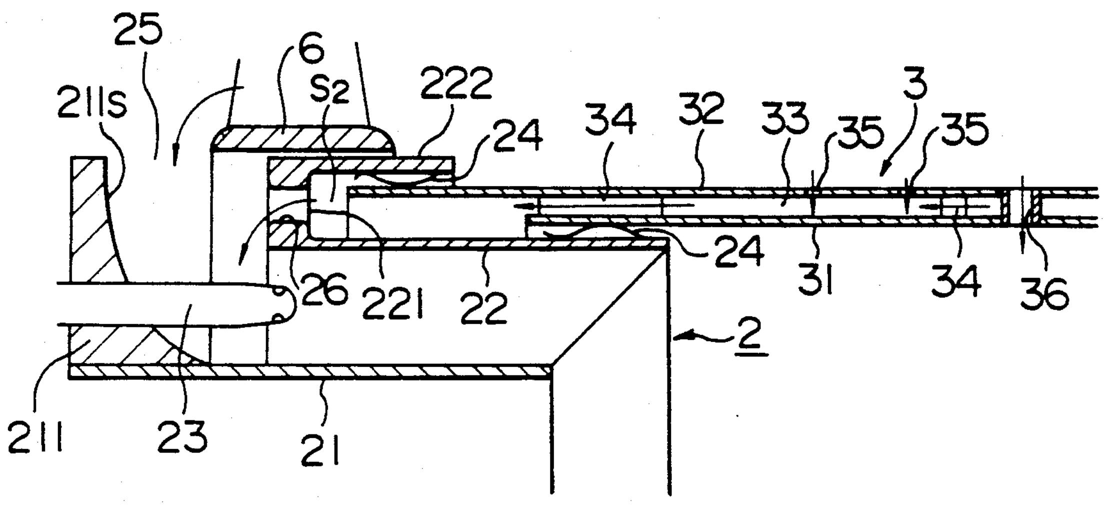
FIG. 2 is an enlarged fragmentary sectional view showing a part II in FIG. 1.

As clearly shown in FIG. 2, the inner chamber wall 21 of the pre-mixing chamber 2 is provided at one end portion thereof with an up-standing wall element 211 which extends circumferentially and radial outwards and has a smoothly curved surface 211s. An up-standing wall element 221 is also integrally provided at one end portion of the outer chamber wall 22 of the pre-mixing chamber 2, which extends circumferentially and radially outwards. A stationary ring element 222 is further provided integrally in a radial outer peripheral edge of the up-standing wall element 221. The stationary ring element 222 cooperates with the other chamber wall 22 in defining therebetween an annular space S2, in which one end portion of the main combustion chamber 3 is received and held through spring seal members 24. The upstanding wall element 211 cooperates with the up-standing wall element 221 to define therebetween a cylindrical air inlet opening 25 of the pre-mixing chamber 2. The opening 25 coexists with the stationary ring element 222 in the same cylindrical surface. Further, the up-standing wall element 221 is provided with a plurality of intercommunicating air openings 26 for intercommunicating the annular air passage 33 in the main combustion chamber 3 to the pre-mixing chamber 2.

A movable ring 6 is disposed with surrounding the stationary ring element 222 and is supported by built-up springs 61 for axial movement along the same cylindrical surface, i.e. the stationary ring element 22. The movable ring 6 is moved by an operating lever 62 to vary an effective area of the cylindrical air inlet opening 25 of the pre-mixing chamber 2 (FIG. 1). Accordingly, when the amount of fuel to be supplied into the pre-mixing chamber 2 is changed, the amount of air to be supplied into the pre-mixing chamber 2 is changed, the amount of air to be supplied into the pre-mixing chamber 2 can be varied so that the pre-mixture of an appropriate consistency is obtained.

The operation of the above combustor CB will be explained hereinunder with reference to FIGS. 1 and 2.

High pressure air from the compressor CP is supplied to the combustor CB through an air inlet duct 7 provided therein. A part (Al) of such air spirals around the main combustion chamber 3 and flows into the primary combustion chamber 1 through a plurality of holes 121 formed in the outer tube 12 of the primary combustion chamber 1. Further, fuel is also supplied from a fuel passage 14 into the primary combustion chamber 1 through the fuel injection nozzles 13. Air and fuel are mixed in the primary combustion chamber 1, and the ignited and burnt in a first burning stage.

Another part ($A_{21}$) of air from the compressor CP flows into the pre-mixing chamber 2 through the cylindrical air inlet opening 25. Fuel is supplied from a fuel passage 27 into the pre-mixing chamber 2 through the fuel injection nozzles 23. Air and fuel is pre-mixed in the pre-mixing chamber 2 to produce a pre-mixture of air and fuel. Such pre-mixture is supplied into the main combustion chamber 3, and is ignited and then burnt or combusted in a second burning stage located downstream side of the first burning stage with respect to a direction of the burnt or combusted gas. The combustion in the first burning stage continues for full-time operation of the plant, i.e. from the start thereof to the rated operation thereof. However, the combustion in the second burning stage is carried out during a part of operation time of the plant, i.e. from a partial load operation thereof to the rated operation thereof.

Figure 3:
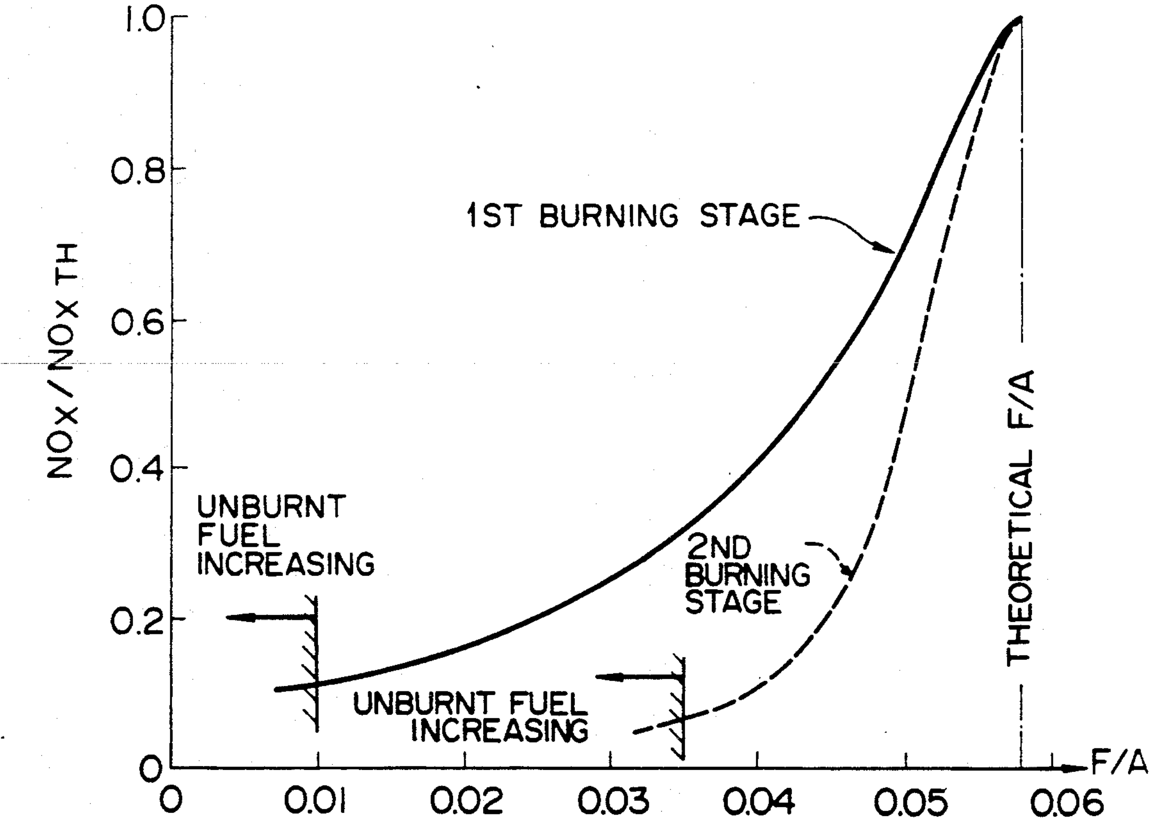
FIG. 3 is a graphical illustration of a relationship between a ratio of fuel to air and a ratio of NOx generated to $NOx_{TH}$ generated in theoretical F/A ratio.

Under the condition that the ratios of fuel to air (fuel/air) in the respective burning stages are kept less than the theoretical ratios, namely, the mixtures in the respective burning stages are maintained poor, it becomes possible to make low temperature combustions in the burning stages, whereby NOx generation is effectively suppressed. Referring now to FIG. 3, it is understood that in each of burning stages, when the mixture of a fuel/air ratio less than the theoretical ratio is burnt or combusted, the NOx generation is suppressed and the amount of NOx generated is reduced as compared with the combustion of the mixture of a fuel/air ratio more than the theoretical one.

As apparent from the disclosure in FIG. 3, as compared with the combustion in the first burning stage, the poor mixture combustion in the second burning stage in which the pre-mixture is burnt or combusted considerably affects the reduction of NOx, since there is no high temperature spot in the flame in the second burning stage. Namely, in the second burning stage, the reduction of NOx is effected by a lesser amount of air, as compared with in the first burning stage. Further, unburnt or uncombusted gas generated due to poor mixture combustion increases abruptly in the first burning stage under the condition that the fuel/air ratio is less than 0.01. To the contrary, in the second burning stage, such increase occurs under the condition that the fuel/air ratio is less than 0.035. Namely, it will be understood that it is more hard to generate unburnt gas in the first burning stage, as compared with the second burning stage. In other words, the first burning stage is more preferable for poor mixture combustion than the second burning stage. Accordingly, in order to suppress NOx generation with a well-proportioned combustion, it is particularly preferable that the value of the fuel/air ratio in the first burning stage is maintained between 0.01 and 0.025, and the value of the fuel/air ratio in the second burning stage is maintained between 0.035 and 0.045, as shown in FIG. 3.

Further, with respect to reduction of NOx, since there is no high temperature spot in the flame in the second burning stage, the amount of NOx generated therein is considerably small. Accordingly, on a high load operation of the gas turbine at which NOx generated increases, it is preferable that a larger amount of mixture is burnt or combusted in the second burning stage rather than in the first burning stage. Namely, if a larger amount of fuel is supplied to the pre-mixing chamber 2 rather than the primary combustion chamber 1, the reduction of NOx is effectively conducted. It is, therefore, required to increase the amount of air to be supplied to the pre-mixing chamber 2.

To this end, according to the above-explained embodiment, as clearly shown in FIGS. 2, the cooling air flowing the annular air passage 33 in the main combustion chamber 3 is adapted to be introduced into the pre-mixing chamber 2 through the intercommunicating air openings 26 so as to supplement the air to be supplied to the pre-mixing chamber 2. The main combustion chamber 3 is constructed by the inner cylindrical wall 31 and the outer cylindrical wall 32, which are connected to each other through a plurality of ribs 34 to provide the annular air passage 33. The main combustion chamber 3 is so assembled that a radial gap between the walls 31 and 32 increases gradually outwards the upstream side of a flow direction of the burnt gas, thereby air is readily introduced into the annular air passage 33 through a plurality of introduction holes 35 formed in the outer cylindrical wall 32 and flows through the passage 33 as cooling air for the main combustion chamber 3. Ten to twenty percent ($A_{22}$) of the cooling air flowing the annular air passage 33 is introduced into the pre-mixing chamber 2 and used as burning air. Accordingly, due to the burning air increment, it is possible to distribute seventy to eighty percent of fuel supplied to the combustion CB to the pre-mixing chamber 2 upon a rating operation of the gas turbine GT.

Figure 4:
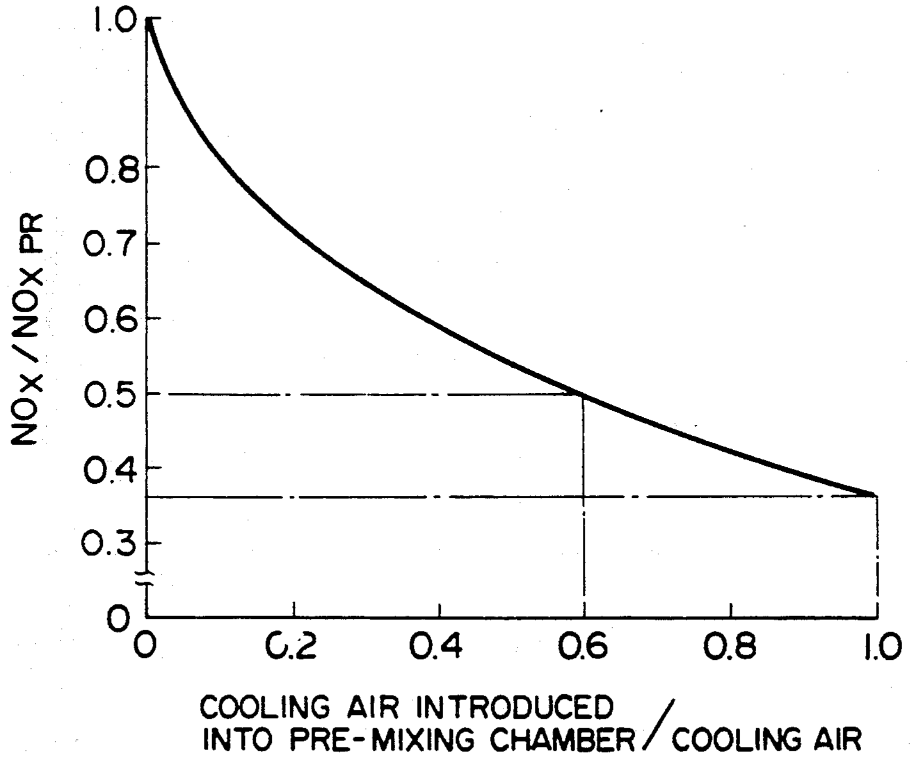
FIG. 4 is a graph showing a relationship between an amount of NOx generated and a ratio of amount of cooling air supplied to the pre-mixing chamber to a whole amount of cooling air.

FIG. 4 shows the characteristics of NOx generation in comparison between the prior art combustor and the combustor according to the present invention under the condition that the combustion temperature is 1400° C. The abscissa represents a ratio of amount of cooling air introduced into the pre-mixing chamber to a whole amount of cooling air, and the ordinate represents a ratio of amount of NOx generated in the combustor according to the present invention to amount of NOx PR generated in the prior art combustor in which no cooling air is used as burning air. As apparent from FIG. 4, for example, if sixty percent of cooling air is additionally supplied to the pre-mixing chamber as burning air, the amount of NOx generated is reduced by half. Further, if all of cooling air is supplied to the pre-mixing chamber, the amount of NOx generated is reduced to one third.

Incidentally, in this embodiment, the main combustion chamber 3 is provided with a plurality of conduits 36 for directly introducing air from an exterior of the main combustion chamber 3 into an interior thereof for cooling the burning gas (FIG. 2).

Figure 5:
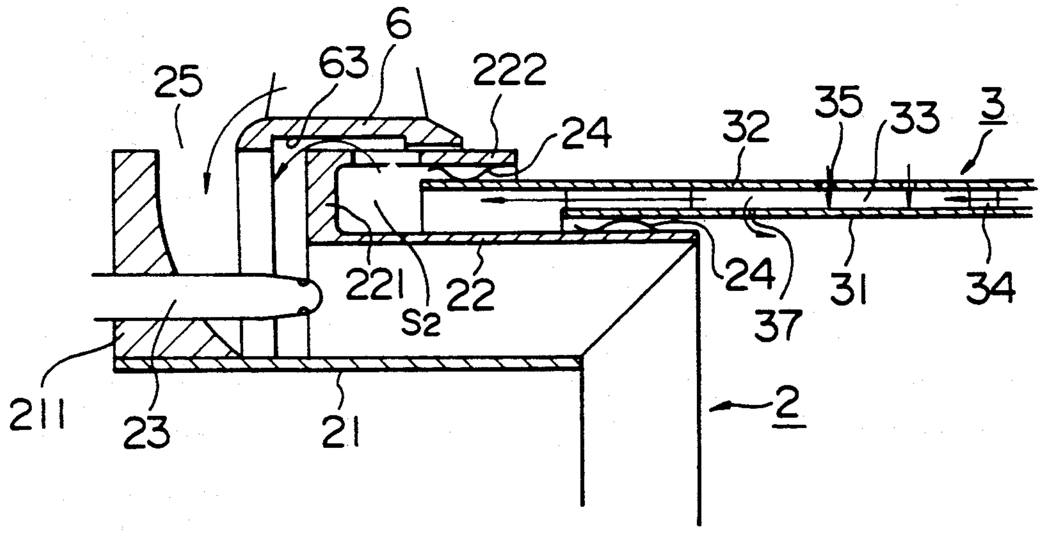
FIG. 5 is an enlarged fragmentary sectional view showing the same part of another embodiment as in FIG. 2.

Referring now to FIG. 5, shown is a combustor according to another embodiment of the present invention. The explanation therefor will be made hereinunder. The constitution of this combustor is substantially identical to that of the aforementioned combustor. The differences therebetween reside in the movable ring 6 and in the intercommunicating air openings 26. In the embodiment of FIG. 5, the intercommunicating air openings 26 are not provided in the up-standing wall element 221, but in the stationary ring element 222. Further, the movable ring 6 is provided at inner peripheral surface with a circumferential recess 63.

In a higher load operation of the gas turbine GT, the movable ring 6 is positioned in an open position shown in FIG. 5. The cooling air flowing the annular air passage 33 is introduced into the pre-mixing chamber 2 through the intercommunicating air openings 26 and an annular space between the circumferential recess 63 and the stationary ring element 222. On the contrary, in a low load or a partial load operation of the gas turbine GT, fuel to be supplied to the pre-mixing chamber 2 is lowered. The movable ring 6 is moved upstream side to reduce an effective opening area of the cylindrical air inlet opening 25. Simultaneously, the movable ring 6 reduces an effective opening are of the intercommunicating air opening 26. Accordingly, it is possible to reduce not only air directly introduced into the pre-mixing chamber 2 but also cooling air introduced into the pre-mixing chamber 2 from the annular air passage 33, in accordance with the fuel reduction. Whereby a low level combustion appropriate for the partial load operation is conducted properly.

Incidentally, in the embodiment of FIG. 5, the main combustion chamber is provided with a plurality of openings 37 formed in the inner cylindrical wall 31. A part of cooling air flowing the air passage 33 is injected into an interior of the main combustion chamber 3 for cooling the burning gas.

Figure 6:
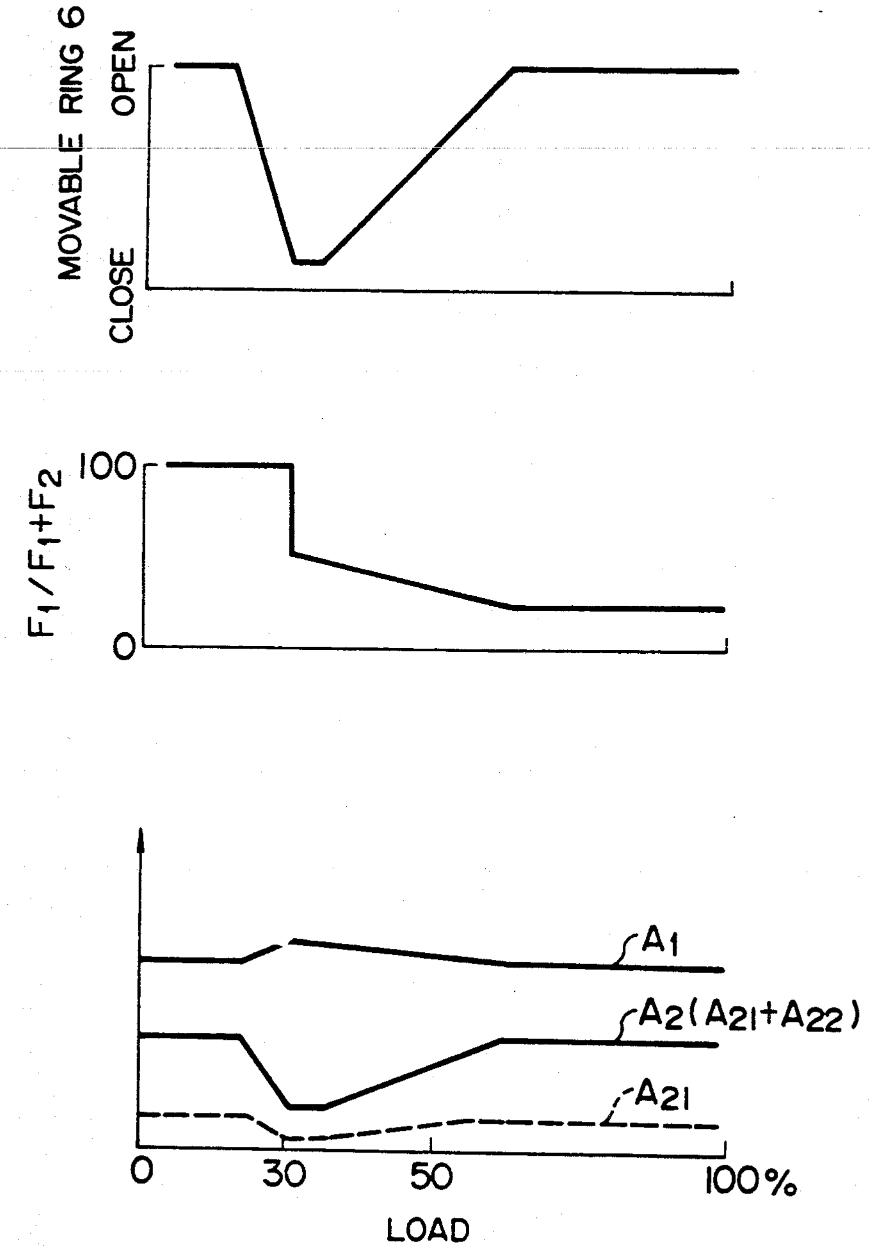
FIG. 6 is a graphical illustration of characteristics of the combustor according to the present invention.

Referring to FIG. 6, a change of operating conditions of the combustor is shown with respect to a gas turbine load. During a low load operation of the gas turbine, e.g. from no load operation to thirty percent load operation, fuel (Fl) is supplied to the primary combustion chamber 1 exclusively, and is burnt or combustion with the air ($A_1$) in the first burning stage. On the contrary, during a higher load operation of the gas turbine, e.g. from thirty percent load operation to full load (rating) operation, fuel ($F_1+F_2$) is supplied not only to the primary combustion chamber 1 but also to the pre-mixing chamber 2, and then combustion is occurs in the first and the second burning stages. In the higher load operation, the movable ring 6 is moved to open the cylindrical air inlet opening 25 and the intercommunicating air openings 26, so that air ($A_2$) to be supplied into the pre-mixing chamber 2 increases, which includes air ($A_{21}$) through from the inlet opening 25 and air ($A_{22}$) through from the air openings 26. Therefore, it becomes possible to increase fuel to be supplied into the pre-mixing chamber 2, and then also possible to increase a ratio of the combustion in the second burning stage to the combustion in the both burning stages. Accordingly, the reduction of NOx is effectively conducted. On the transition from the low load operation to the higher load operation, the movable ring 6 is once moved to close the cylindrical air inlet opening 25 and the intercommunicating air openings 26 simultaneous with reduction of fuel to be supplied to the primary combustion chamber 1. Thereafter, it is carried out to gradually increase fuel to be supplied to the both chambers 1 and 2, whereby it is possible to reduce NOx generation in the first burning stage on the transition from the low load operation from the higher load operation, i.e. upon rich mixture combustion.

According to the present invention, air for cooling the main combustion chamber 3 is used to supplement the air of the pre-mixture. It is possible to burn a large amount of poor pre-mixture in the second burning chamber, which contributes largely to the reduction of NOx. Therefore, the amount of NOx generated can be considerably reduced.

In order to supply burnt gas of a higher temperature to drive a higher temperature gas turbine, it is required for the combustor to consume larger amount of burning air and larger amount of air for cooling the combustion chamber so as to raise the combustion temperature. Accordingly air supply for poor mixture combustion fails. However, according to the present invention, cooling air for cooling the combustion chamber wall is used as burning air, so that it can be possible to considerably reduce NOx generation in the combustor associated with the higher temperature gas turbine.

What is claimed is:

1. A combustor cooperating with a compressor means in driving a gas turbine means, the combustor comprising:

a primary combustion chamber means including an inner tube means and an outer tube means surrounding said inner tube means to define an annular space therebetween for receiving fuel from said fuel injection means;

pre-mixing chamber means disposed axially downstream of and communicating with said primary combustion chamber means, said pre-mixing chamber means being defined by an inner chamber wall means and an outer chamber wall means surrounding said inner chamber wall means with a plurality of fuel injection means extending into said pre-mixing chamber means to supply fuel thereto;

a main combustion chamber means disposed axially downstream of and communicating with said pre-mixing chamber means, said main combustion chamber means including an inner cylindrical wall means and an outer cylindrical wall means arranged so as to define therebetween an annular air passage means communicating with said pre-mixing chamber means to supply air thereto for increasing an amount of combustion air supplied to the pre-mixing chamber means thereby enabling an increased fuel supply by the plurality of fuel injection means to the pre-mixing chamber means to reduce an amount of NOx generated during a combustion of a pre-mixture in the pre-mixing chamber means; and a radial gap between the inner cylindrical wall means and an outer cylindrical wall means forming the annular air passage means increases gradually outwardly to an upstream side of a flow direction of combusted gas resulting from the combustion.

2. A combustor according to claim 1, wherein said air passage means includes a plurality of hole means provided in the outer cylindrical wall means for introducing air into the air passage means, and wherein the air introduced by said air hole means cools the inner cylindrical wall means of the main combustion chamber means while flowing to the pre-mixing chamber means.

3. A combustor according to claim 2, wherein the amount of combustion air supplied to the pre-mixing chamber means is in a range of ten to twenty percent of the air flowing in the annular passage means.

4. A combustor according to claim 3, wherein, during a rated operation of the gas turbine means, seventy to eighty percent of fuel supplied to the combustor is supplied to the pre-mixing chamber means.

5. A combustor cooperating with a compressor means in driving a gas turbine means, the combustor comprising:

a primary combustion chamber means including an inner tube means and an outer t..e means surrounding said inner tube means to define an annular space therebetween for receiving fuel from fuel injection means;

pre-mixing chamber means disposed axially downstream of an communicating with said primary combustion chamber means, said pre-mixing chamber means being defined by an inner chamber wall means and an outer chamber wall means surrounding said inner chamber wall means with a plurality of fuel injection means extending into said pre-mixing chamber means to supply fuel thereto;

a main combustion chamber means disposed axially downstream of and communicating with said pre-mixing chamber means, said main combustion chamber means including an inner cylindrical wall means and an outer cylindrical wall means arranged so as to define therebetween an annular air passage means communicating with said pre-mixing chamber means to supply air thereto for increasing an amount of combustion air supplied to the pre-mixing chamber means thereby enabling an increased fuel supply by the plurality of fuel injection means to the pre-mixing chamber means to reduce an amount of NOx generated during a combustion of a pre-mixture in the pre-mixing chamber means;

means provided at one end of the pre-mixing chamber means for defining an annular space for receiving an end of the main combustion chamber means including a circumferentially disposed radially outwardly extending wall means provided on the outer chamber wall means of the pre-mixing chamber means and a stationary ring means radially spaced from the outer chamber wall means to define the annular space;

a plurality of means arranged in the circumferentially disposed radially outwardly extending wall means for intercommunicating the annular passage means with the pre-mixing chamber means, said means for intercommunicating being in communication with a cylindrical air inlet opening means of the pre-mixing chamber means; and an additional circumferentially disposed radially outwardly extending wall means arranged on the inner chamber wall means of the pre-mixing chamber means at a position axially spaced from the stationary ring means so as to define therebetween the cylindrical air inlet opening means.

6. A combustor according to claim 5, wherein the additional wall means includes a smoothly curved surface extending in a direction toward the pre-mixing chamber means.

7. A combustor according to claim 6, further comprising means for varying a cross-sectional area of the air inlet opening means so as to control a supply of combustion air to the pre-mixing chamber means.

8. A combustor according to claim 7, further comprising conduit means interposed between the inner cylindrical wall means and the outer cylindrical wall means for directly introducing air from an exterior of the main combustion chamber means into an interior thereof for cooling burning combustion gases.

9. A combustor cooperating with a compressor in driving a gas turbine, said combustor comprising:

a first burning stage in which air from said compressor and fuel are burnt;

a pre-mixing chamber defined by an inner chamber wall and an outer chamber wall surrounding said inner chamber wall;

a first air passage through which air from said compressor flows into said pre-mixing chamber;

a second air passage through which air from said compressor flows into said pre-mixing chamber;

means for injecting fuel into said pre-mixing chamber to mix the fuel with said air from said first and second air passages to produce a pre-mixture;

a second burning stage in which said pre-mixture is burnt, said second burning stage being located on a downstream side of said first burning stage with respect to a flow of burnt gas;

a first cylindrical wall means surrounding said second burning stage and leading burnt gas from said first and second burning stages toward said gas turbine, said first cylindrical wall means being provided with a plurality of openings;

casing means surrounding said first cylindrical wall means for defining therebetween said first air passage; and second cylindrical wall means disposed radially inside said first cylindrical wall means for defining therebetween said second air passage.

10. A combustor according to claim 9, wherein said second cylindrical wall means is arranged so that air flowing through said second air passage is completely introduced into said pre-mixing chamber.

11. A combustor according to claim 9, wherein said first and second air passages meet at a portion of said pre-mixing chamber upstream of said means for injecting fuel.

* * * * *